(12) United States Patent
Chou (10) Patent No.: US 7,354,058 B2
(45) Date of Patent: Apr. 8, 2008

(54) FOLDING STRUCTURE OF CARRIER (75) Inventor: Yu-Te Chou, Chia Tai Industrial Tai Pao (TW)

(73) Assignee: Link Treasure Limited, Tortola (VG)

( * ) Notice: Subject to any disclaimer, the term of this patent is extended or adjusted under 35 U.S.C. 154(b) by 251 days.

(21) Appl. No.: 11/160,899

(22) Filed: Jul. 14, 2005

(65) Prior Publication Data
US 2006/0017264 A1    Jan. 26, 2006

(30) Foreign Application Priority Data
Jul. 23, 2004    (TW) .............................. 93211669 U (51) Int. Cl.
*B62B 7/06*    (2006.01)

(52) U.S. Cl. .................. 280/651; 280/656; 280/657; 280/658

(58) Field of Classification Search ................ 280/638, 280/639, 647, 651, 656, 657, 658, 204
See application file for complete search history.

(56) References Cited

U.S. PATENT DOCUMENTS

| | | | | |
|---|---|---|---|---|
| 5,074,575 A | * | 12/1991 | Bigo | 280/642 |
| 5,364,119 A | * | 11/1994 | Leu | 280/647 |
| 5,474,316 A | * | 12/1995 | Britton | 280/204 |
| 5,577,746 A | * | 11/1996 | Britton | 280/204 |
| 5,785,333 A | * | 7/1998 | Hinkston et al. | 280/204 |
| 5,829,770 A | * | 11/1998 | Chiu | 280/204 |
| 5,829,771 A | * | 11/1998 | Hsu | 280/204 |
| 5,947,497 A | | 9/1999 | Hsu | 280/204 |
| 5,979,921 A | * | 11/1999 | Derven et al. | 280/204 |
| 5,984,332 A | * | 11/1999 | Beaudoin et al. | 280/204 |
| 6,698,788 B2 | * | 3/2004 | Yang | 280/647 |
| 6,705,628 B2 | * | 3/2004 | Kahmann | 280/204 |
| 6,959,938 B1 | * | 11/2005 | Liu | 280/204 |
| 6,976,697 B2 | * | 12/2005 | Britton et al. | 280/647 |
| 2002/0074764 A1 | * | 6/2002 | Allen et al. | 280/204 |
| 2002/0096857 A1 | * | 7/2002 | Valdez et al. | 280/293 |
| 2003/0201626 A1 | * | 10/2003 | Hartenstine et al | 280/642 |

FOREIGN PATENT DOCUMENTS

DE         4025009 A   *   2/1992

* cited by examiner

*Primary Examiner*—Christopher P. Ellis
*Assistant Examiner*—Katy Meyer
(74) *Attorney, Agent, or Firm*—Alan Kamrath; Kamrath & Associates PA (57) ABSTRACT

A folding structure of a carrier includes an expansion member connected between a base frame and an extension member. As the expansion member pivotally passes through the point of over-tangency (the turning point of balance of force), the extension member is extended or folded due to a liner bias force provided by the expansion member and also due to the change in length of the expansion member. For example, the expansion member starts to elongate itself when passing through the point of over-tangency, generating a force to extend the extension member in an extended position automatically.

10 Claims, 9 Drawing Sheets

FOLDING STRUCTURE OF CARRIER

FIELD OF THE INVENTION

The present invention relates to a frame of a baby trailer or a baby stroller, and more particularly, to a folding structure including an extension member assisted with an expansion member.

BACKGROUND OF THE INVENTION

A trailer adapted at the rear of a bicycle for towing thereby is primarily provided to carry small children and further to interact with them. Since such a trailer has a certain volume and is used outdoors, the frame of the trailer is usually foldable for convenient transportation and storage. A conventional frame is in U.S. patents, such as U.S. Pat. Nos. 5,947,497, 5,474,316 and 5,577,746. In general, the frame includes a lower frame member and an upper frame member having a rear end pivotally connected to a forward end of the lower frame member and extending upward; and a pair of pivot units, each of which has one end pivotally connected to the lower frame member and the opposite end pivotally connected to the upper frame member, defining a cargo compartment. The frame of the trailer is extended by means of the pair of pivot units positioned in a line or in parallel that is fixed by a fastened member, so as to support the upper frame member in an extended position. The frame of the trailer is collapsed by loosening the fastened member to make the pair of the pivot units rotate towards the frame, allowing a pivot point between the upper frame member and the lower frame member to rotate downward and thereby fold the trailer into a compact position.

The aforementioned trailer is shifted inwards to the frame and is placed inside thereof after the pair of the pivot members are folded. Hence, it is quiet inconvenient to extend the folded frame.

SUMMARY OF THE INVENTION

It is one primary object of the present invention to provide an easy and laborsaving way to fold and extend a trailer.

According to the aforementioned object of the present invention, on the one hand, an expansion unit is connected between a base frame and an extension support unit. The expansion unit is expanded due to the change in pivoting distance thereof, and thereby assists in extending and collapsing the extension support unit.

According to the aforementioned object of the present invention, on the other hand, the extension support unit is extended continuously upward to form a handle, which constitute the same as a baby stroller.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENTS

Figure 1:
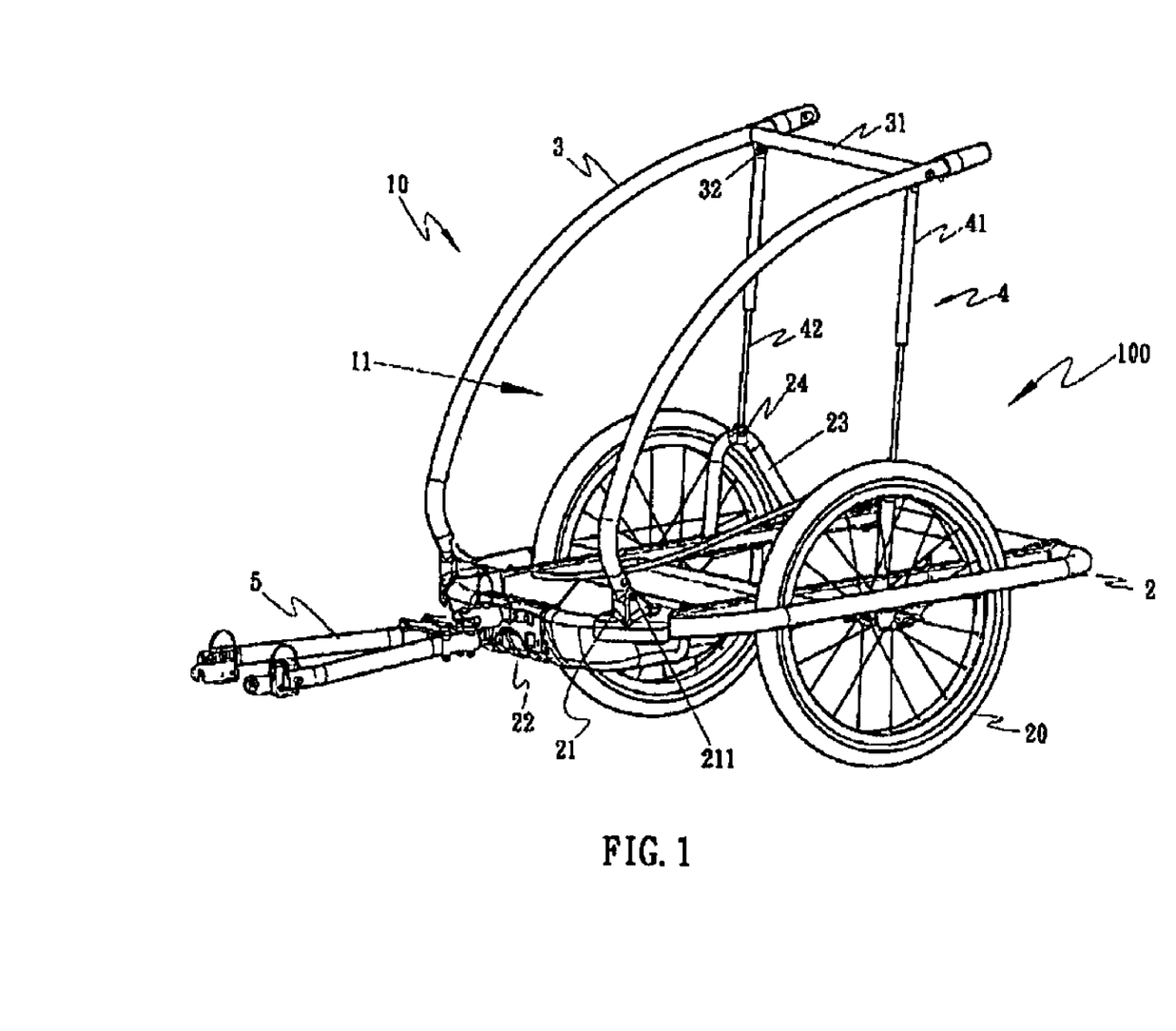
FIG. 1 is a perspective view of the frame of the trailer in accordance with one embodiment of the present invention.
Figure 2:
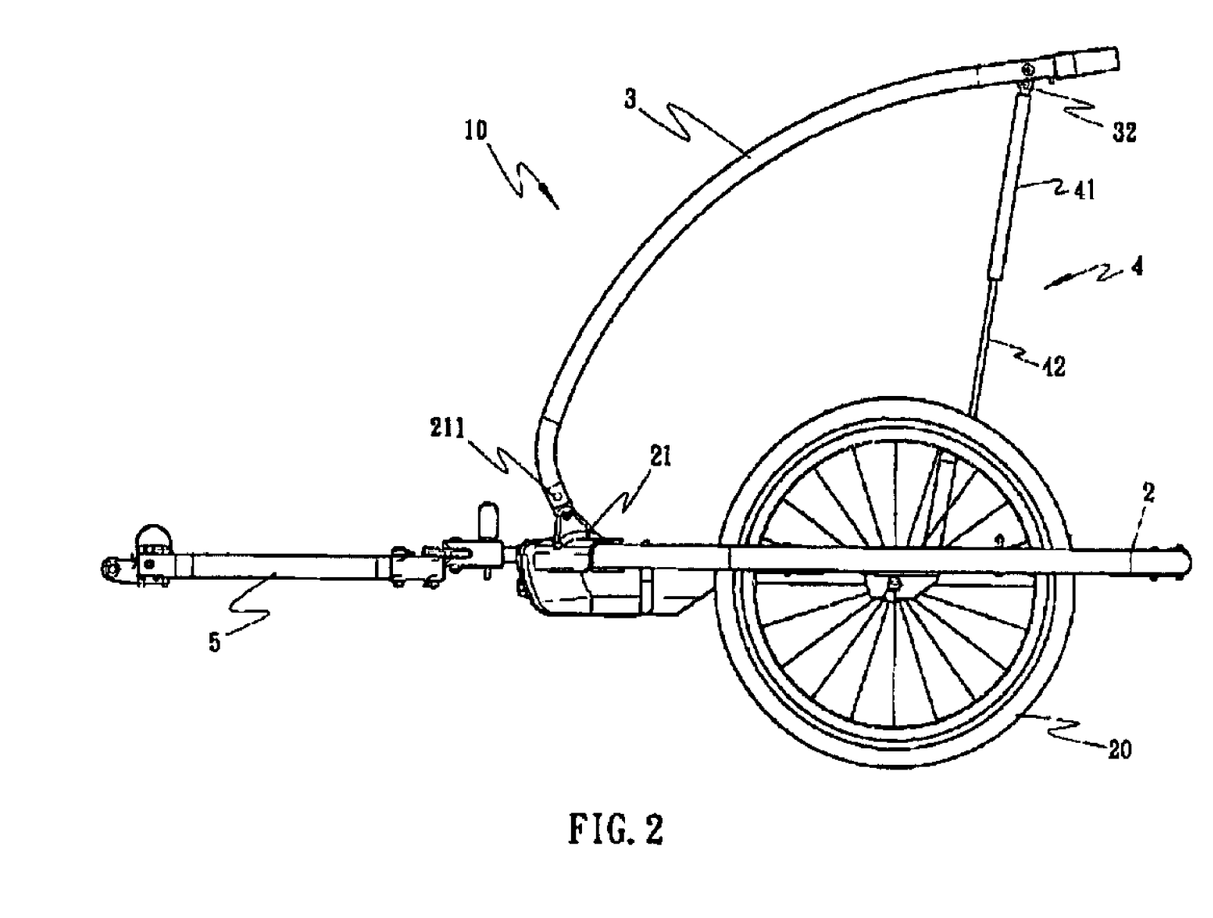
FIG. 2 is a side view of the frame of the trailer in an extended position according to one embodiment of the present invention.
Figure 3:
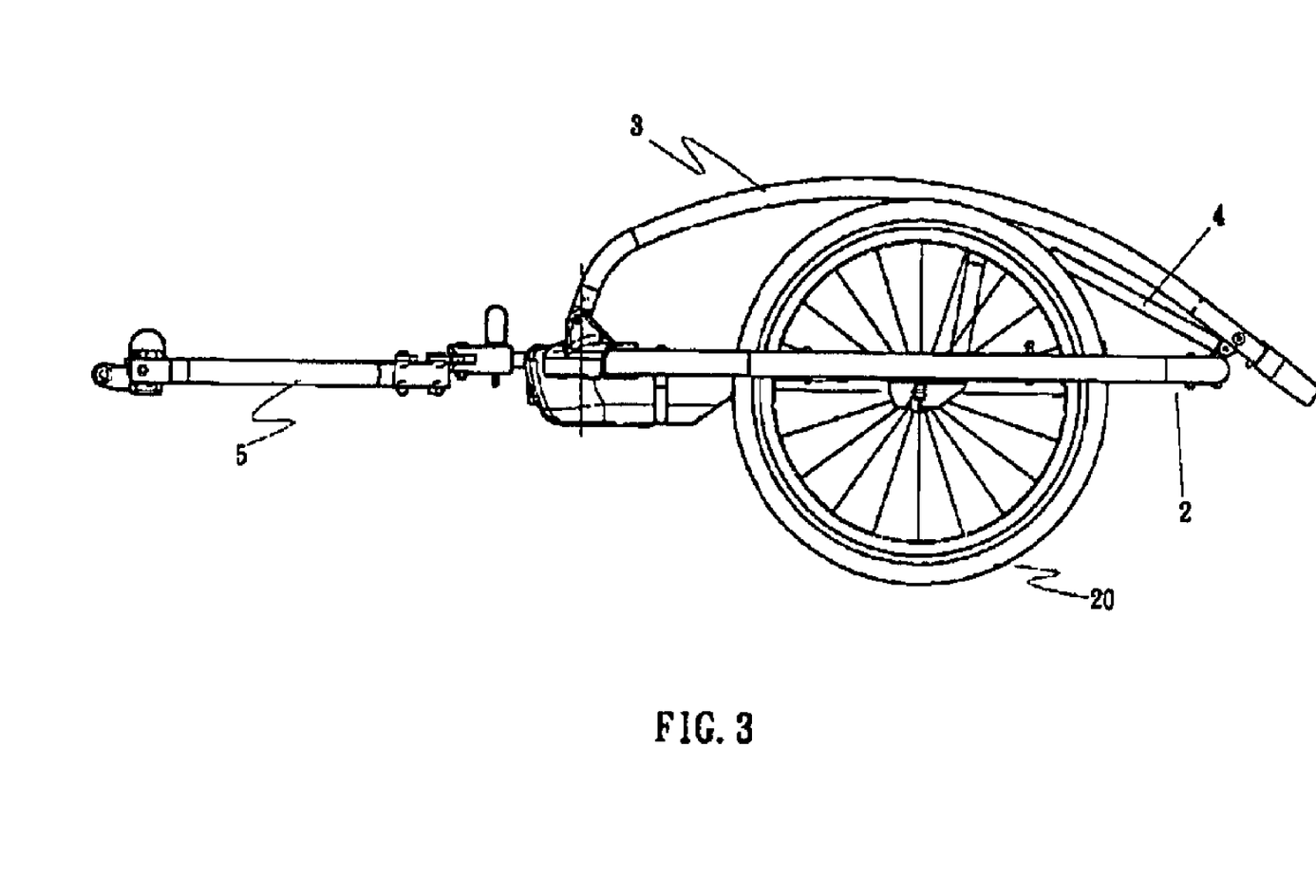
FIG. 3 is a side view of the frame of the trailer in a compact position according to one embodiment of the present invention.

Referring to FIGS. 1-3, which illustrate a folding structure of a carrier according to one preferred embodiment of the present invention, users can make an extension support unit 3 in a fixed position when extending or collapsing a foldable frame 10. In this embodiment, the foldable frame 10 is in the form of a trailer 100, which comprises a base frame 2, a pair of extension support units 3, a pair of expansion units 4, and a connecting shaft 5.

The base frame 2 may be a substantially closed rectangular shaft member, a U-shaped shaft member, or a chassis member with substantially closed bottom. The base frame 2 substantially parallels the ground, and is pivotally connected to wheels 20 on both sides thereof. Both forward ends of the base frame 2 are connected to a pair of first pivot members 21 having pivot points 211, respectively, for connecting the extension support unit 3. A connecting seat 22 is assembled between two first pivot members 21 for fastening the connecting shaft 5. An extending section 23 is disposed at the rear of the base frame 2. A second pivot member 24 is disposed on the extending section 23.

A lower end of the extension support unit 3 is pivotally connected to the pivot point 211 of the first pivot member 21, and hence the extension support unit 3 is extended or folded by rotating through the pivot point 211. The extension support units 3 extend upwardly. A crossing shaft 31 is connected to upper ends of the extension support units 3 to ensure the width between the extension support units 3. A third pivot member 32 is disposed on the upper end of the extension support unit 3.

Figure 9:
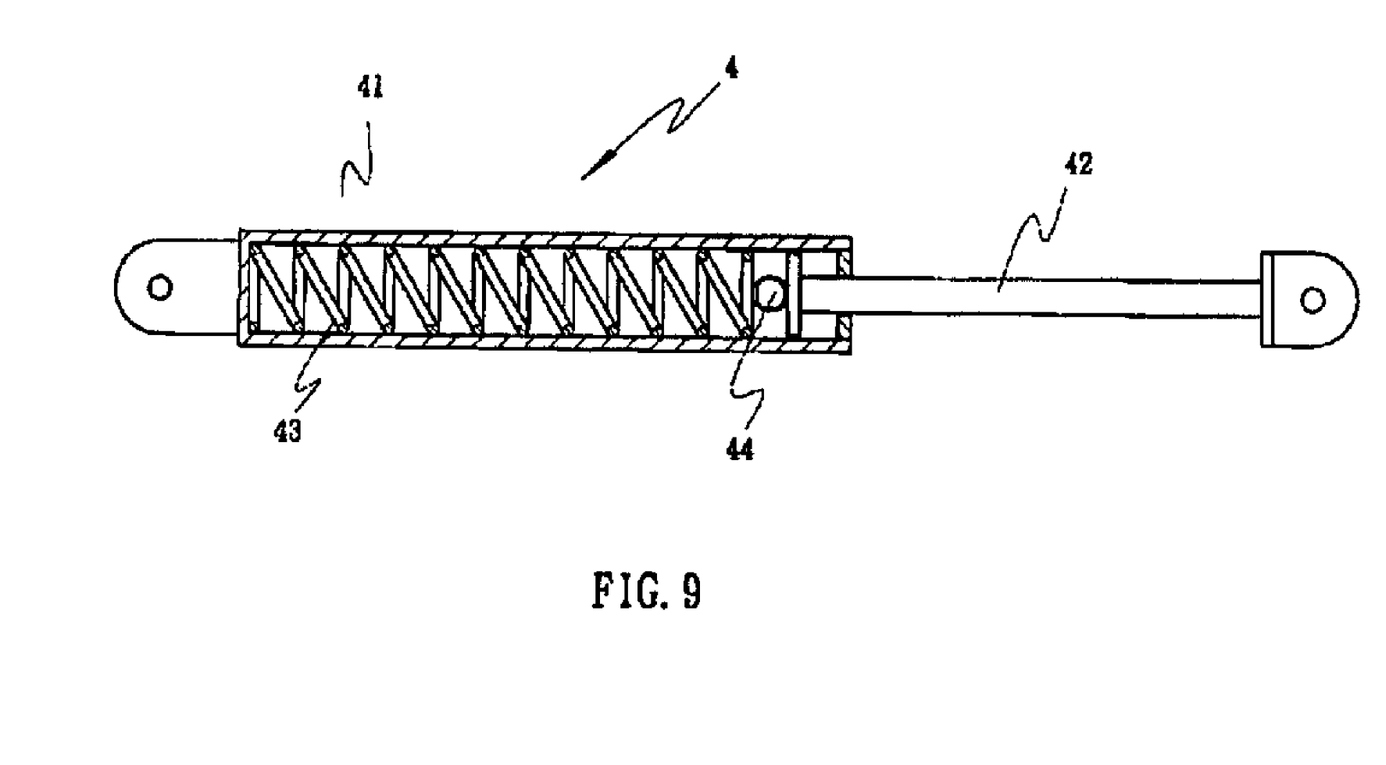
FIG. 9 illustrates the cross-section of spring stick accessory according to one embodiment of the present invention.

Two ends of the expansion unit 4 are connected to the second pivot member 24 and the third pivot member 32, respectively. In one embodiment of the present invention, the expansion unit 4 is an air compressor accessory including a body 41, an expansion link 42 and a control button for controlling air valves (not shown). Using the control button can adjust the expansion link 42 being fixed or expanded. In another embodiment of the present invention, the expansion unit 4 is a spring stick accessory (as shown in FIG. 9) including a body 41, an expansion link 42, a spring 43, and a fixed component 44. Using the fixed component 44 can adjust the expansion link 42 being fixed or moved.

The connecting shaft 5 has a first end connected to the base frame 2 and a second end adapted to a bicycle for towing the foldable frame 10.

Figure 4:
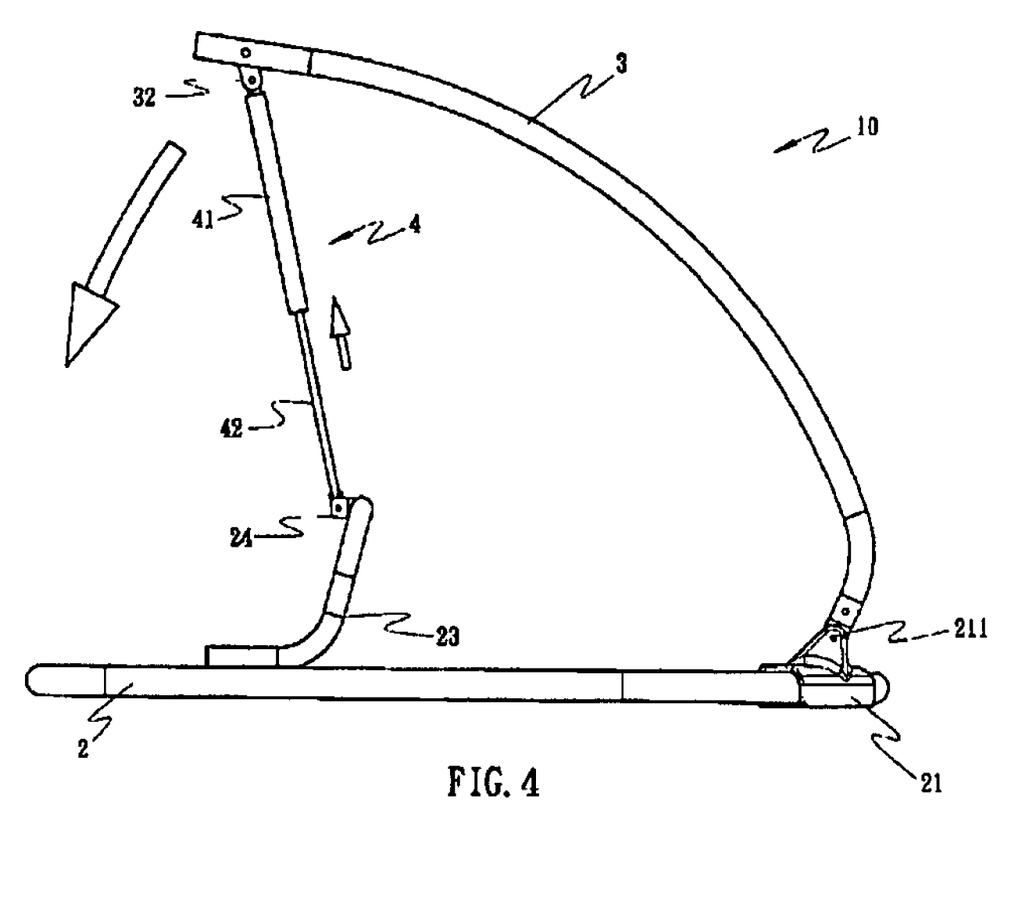
FIG. 4 illustrates an act of folding the frame downward according to one embodiment of the present invention.
Figure 5:
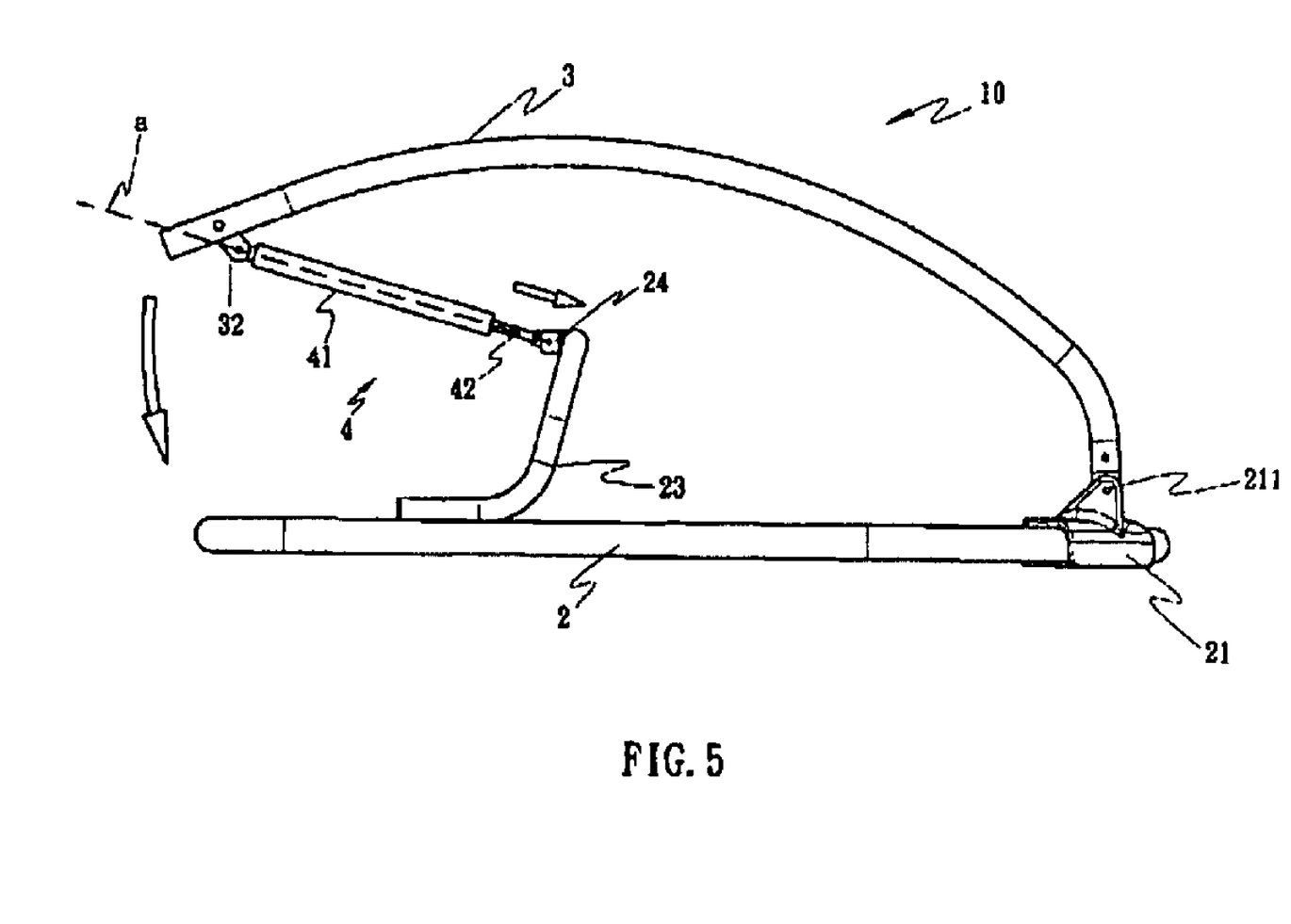
FIG. 5 illustrates an act of the expansion units passing through the angle of over-tangency according to one embodiment of the present invention.
Figure 6:
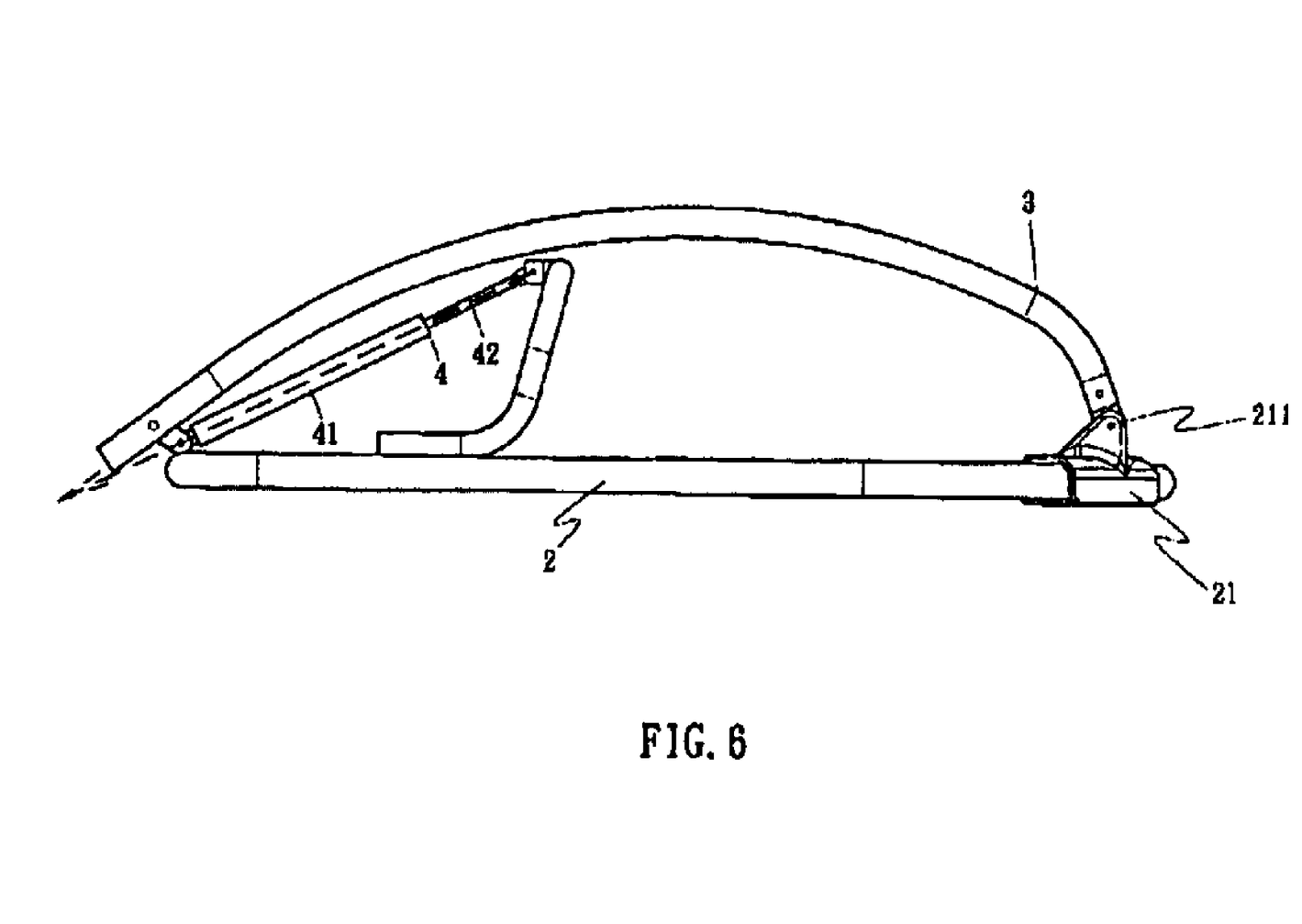
FIG. 6 illustrates an act of folding the frame completely according to one embodiment of the present invention.

Referring to FIGS. 4-6, in accordance with the aforesaid members, the base frame 2, the extension support units 3 and the expansion units 4 support one another (in the meantime, the expansion links 42 of the expansion units 4 are immovable) to define a cargo compartment 11 (behind a disposed seat cloth) for carrying small children. It is desired to fold the foldable frame 10 by releasing the control button of the expansion units 4, which in an embodiment of the invention is an air compressor accessory or by loosening the fixed component 44 of the spring stick accessory such that the expansion link 42 is movable. When users collapse the extension support units 3, the expansion units 4 rotate spontaneously as shown in FIG. 4. The distance between the second pivot member 24 and the third pivot member 32 changes while the extension support units 3 move downward, so the expansion link 42 moves towards the inside of the body 41. As illustrated in FIG. 5, when the expansion units 4 pivotally pass through the angle of over-tangency (point of over-tangency) a, the distance between the second pivot member 24 and the third pivot member 32 becomes longer. In the meantime, the expansion link 42 is pushed outward due to force induced by, for example, air pressure or spring strength, that further folds the extension support units 3 in a compact position and locates the same automatically (as shown in FIG. 6).

If users would like to extend the foldable frame 10, the foldable frame 10 will be in an extended position automatically because the expansion link 42 starts to be pushed out after the expansion units 4 pivotally pass through the angle of over-tangency a. The expansion link 42 is then fixed by operating the control button or the fixed component 44. According to the folding structure of the present invention, the foldable frame 10 is located in an extended position or a compact position automatically by means of the expansion units.

Figure 7:
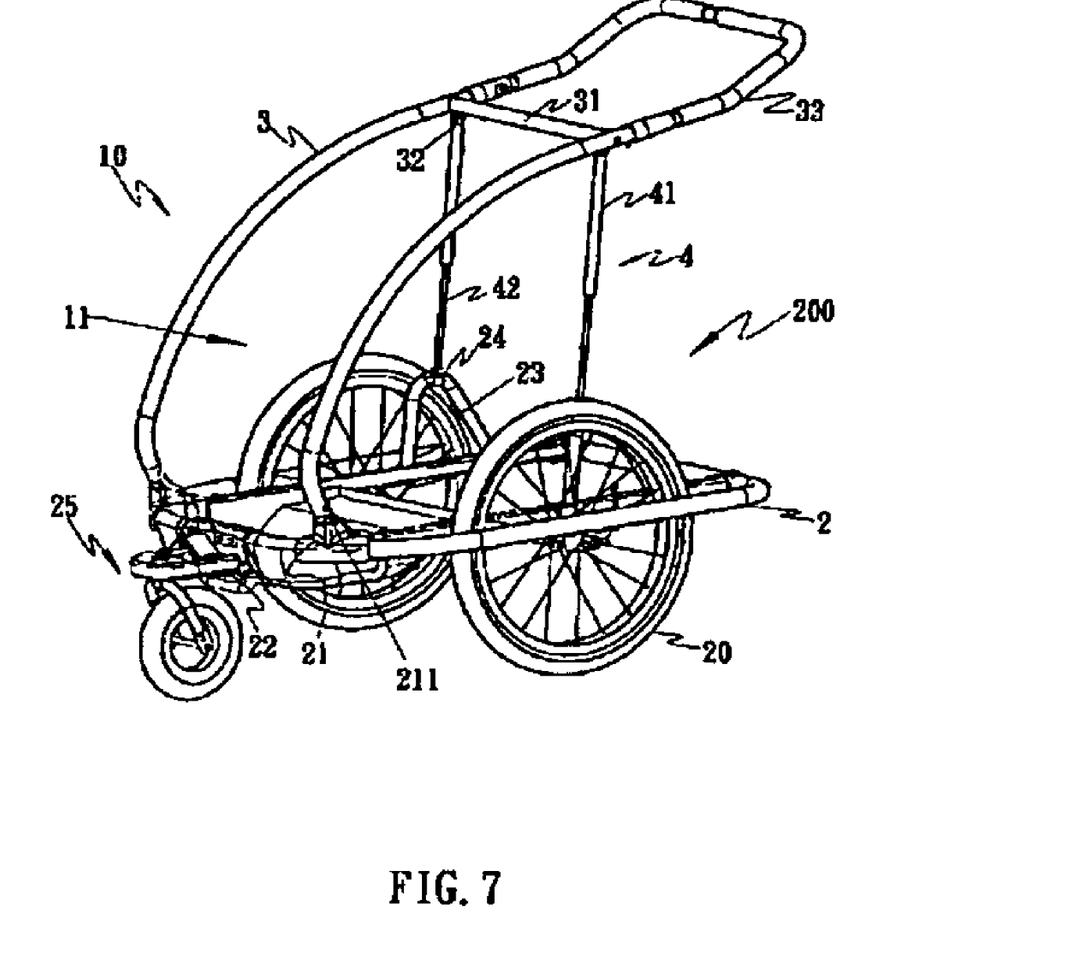
FIG. 7 is a perspective view of the frame of the baby stroller in accordance with one embodiment of the present invention.
Figure 8:
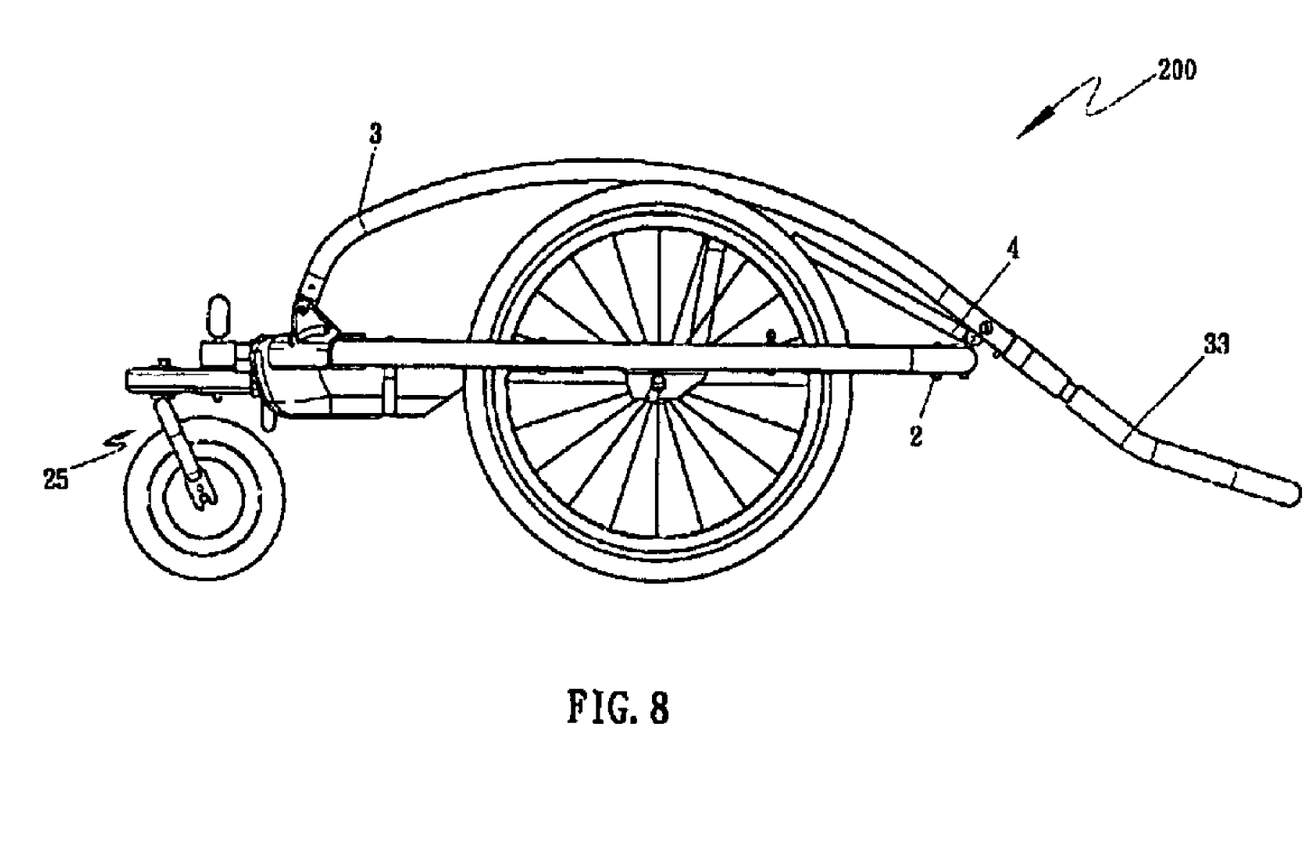
FIG. 8 is a side view of the frame of the baby stroller in a compact position according to one embodiment of the present invention.

In another embodiment, single expansion unit 4 is connected to the base frame 2 and the extension support units 3 to locate the foldable frame automatically. Also referring to FIG. 7 and FIG. 8, the present invention is applied to the frame of a baby stroller 200, which comprises a front wheel 25 connected to the forward end of the base frame 2 and a handle 33 extended continuously from the extension support units 3. The frame of the baby stroller 200 is further located in an extended position or a compact position automatically using the folding structure of the present invention.

Consequently, the present invention overcomes disadvantages of the prior arts. It becomes easier for users to collapse and expand trailers or strollers.

While the invention has been particularly shown and described with reference to the preferred embodiments thereof, these are, of course, merely examples to help clarify the invention and are not intended to limit the invention. It will be understood by those skilled in the art that various changes, modifications, and alterations in form and detail may be made therein without departing from the spirit and scope of the invention, as set forth in the following claims.

What is claimed is:

1. A folding structure of a carrier, which is disposed between two connection members of the carrier, said folding structure comprising:

a base frame having a pivot point;

an extension support unit having a first end connected to said base frame through said pivot point; and an expansion unit having a first end connected to said base frame and a second end connected to said extension support unit, wherein said extension support unit is located in an extended position or a compact position using force provided by said expansion unit, with the expansion unit further including an expansion link and a body, with the expansion link moveable inward and outward of the body, wherein when said extension support unit rotates upward or downward, the expansion link of said expansion unit is shifted from inward to outward after said expansion unit passes through an angle of over-tangency, and thereby said extension support unit is moved to the extended position or the compact position spontaneously.

2. The folding structure of claim 1, wherein said expansion unit is an air compressor accessory.

3. The folding structure of claim 2, wherein said air compressor accessory comprises a body, an expansion link and a control button for controlling air valves and adjusting the expansion link.

4. The folding structure of claim 1, wherein said expansion unit is a spring stick accessory.

5. The folding structure of claim 4, wherein said spring stick accessory comprises a body, an expansion link, a spring and a fixed component for controlling the expansion link.

6. The folding structure of claim 1, further comprising: a connecting shaft connected to a forward end of said base frame; and a wheel pivotally connected to one side of said base frame; wherein the folding structure is adapted to a rear of a bicycle through said connecting shaft for being towed as a baby stroller.

7. The folding structure of claim 1, further comprising a pair of first pivot members disposed at two forward ends of said base frame respectively, with the pair of first pivot members including the pivot point, wherein said base frame is connected to said extension support unit through the pivot point of each of said pair of first pivot members.

8. The folding structure of claim 1, further comprising a second pivot member disposed at a side of said base frame, wherein said base frame is connected to said expansion unit through said second pivot member.

9. The folding structure of claim 8, further comprising a third pivot member disposed at a rear end of said extension support unit, wherein said extension support unit is connected to said expansion unit through said third pivot member.

10. The folding structure of claim 1, further comprising: a front wheel connected to a forward end of said base frame; and a handle extended continuously from a portion of said extension support unit, and thereby constituting a baby stroller.

* * * * *